Aug. 29, 1961 K. SITTEL 2,998,051
METHOD AND APPARATUS FOR FORMING FIBROUS ARTICLES
Filed April 4, 1958 2 Sheets-Sheet 1
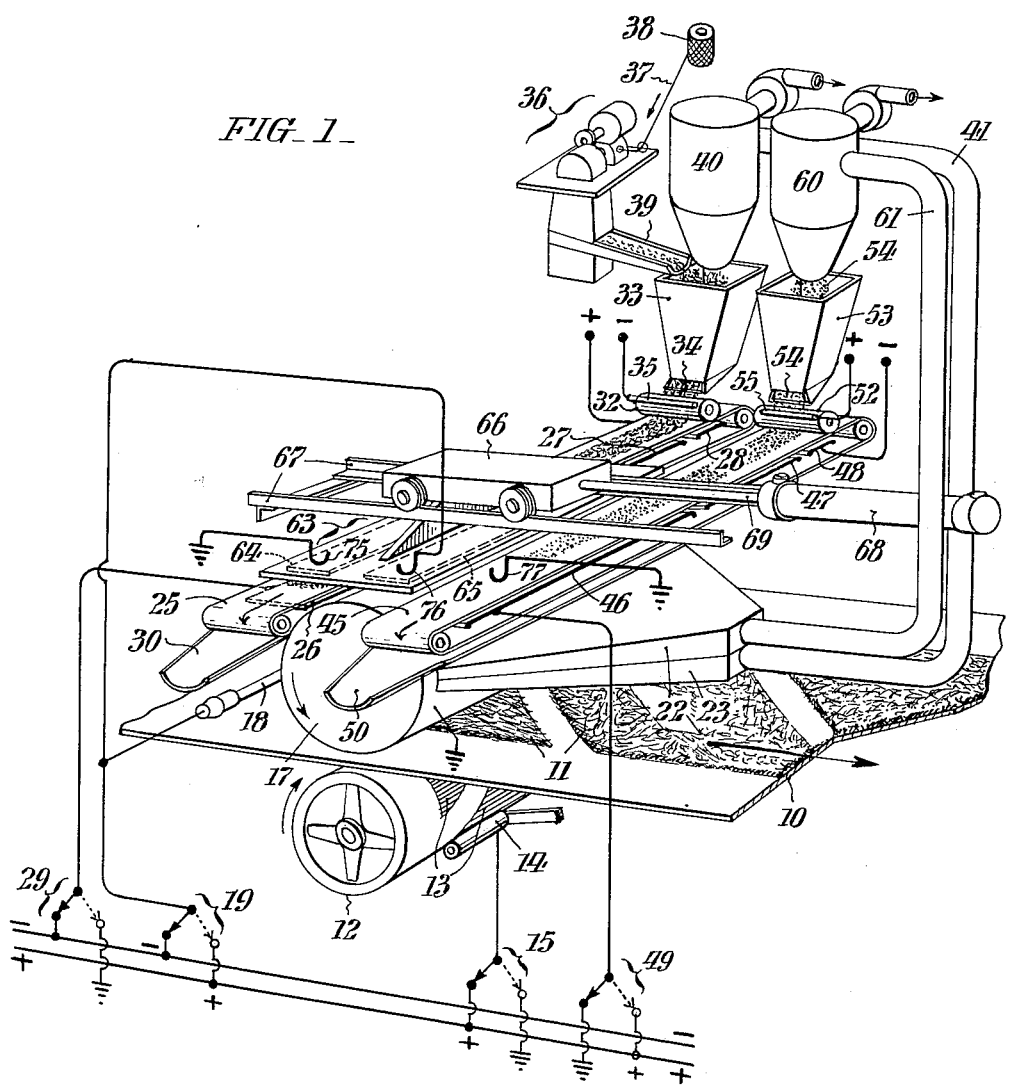
FIG_1_
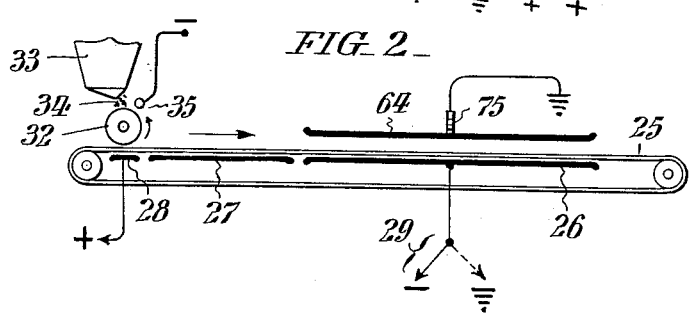
FIG_2_
INVENTOR.
Karl Sittel,
BY Paul & Paul
ATTORNEYS.

Aug. 29, 1961    K. SITTEL    2,998,051
METHOD AND APPARATUS FOR FORMING FIBROUS ARTICLES
Filed April 4, 1958    2 Sheets-Sheet 2
FIG_3_
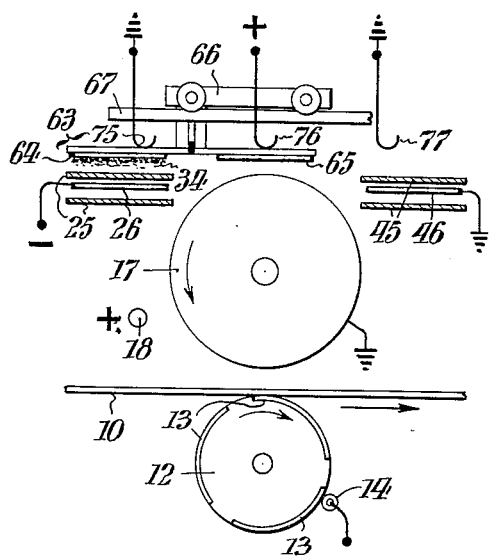
FIG_4_
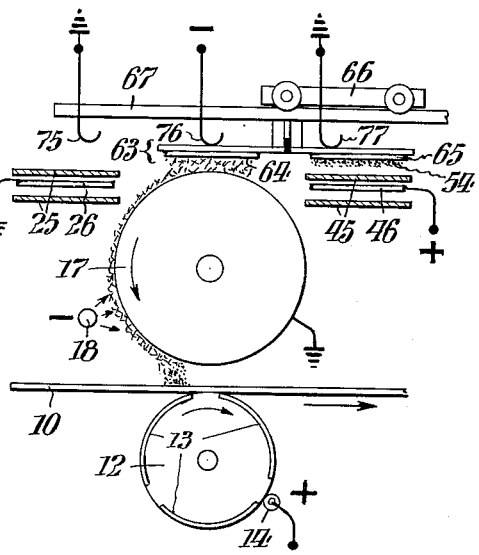
FIG_5_
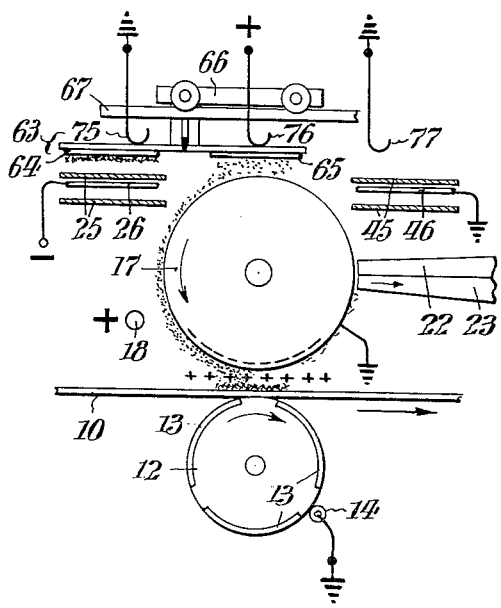
FIG_6_
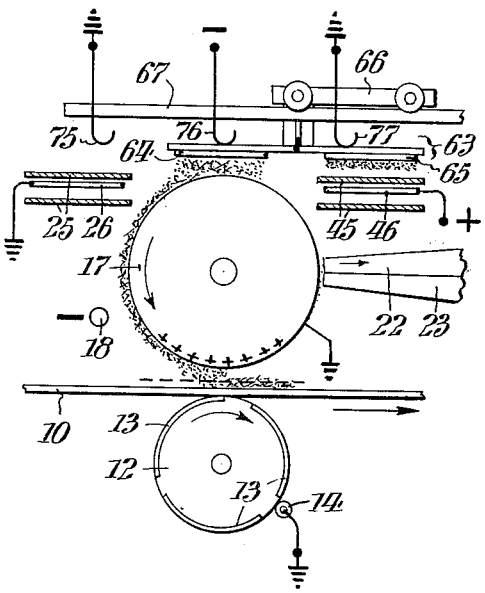
INVENTOR.
Karl Sittel,
BY Paul & Paul
ATTORNEYS.

United States Patent Office 2,998,051
Patented Aug. 29, 1961

2,998,051
METHOD AND APPARATUS FOR FORMING FIBROUS ARTICLES
Karl Sittel, Philadelphia, Pa., assignor to Walsco Company, a partnership
Filed Apr. 4, 1958, Ser. No. 726,506
7 Claims. (Cl. 154—1.7)

This invention relates to a method and apparatus for forming reinforced fiber-resin mats continuously and to an electrostatic matting machine.

In my co-pending patent applications, Serial No. 476,733, filed December 21, 1954, Serial No. 559,221, filed January 16, 1956, now Patent No. 2,920,679, Serial No. 648,336, filed March 25, 1957, now Patent No. 2,925,629, and Serial No. 671,632, filed July 12, 1957, I have described methods and apparatus for forming fibrous products. The apparatus and method of the present invention is an improvement over the inventions of the co-pending applications as will be apparent from the following description.

It is the primary purpose of this invention to provide an integrated method and apparatus to provide a fiber and resin article in a continuous operation.

It is also an object of this invention to provide means for electrostatically combining fiber particles and binder resin articles in a fixed, predetermined amount at fixed predetermined rate.

It is a further object of this invention to provide an electrostatic matting machine in which excess fiber and resin which are not incorporated in the finished article are returned through the apparatus for reuse.

It is a still further object of this invention to provide an apparatus for electrostatically depositing fibers comprising a rotating drum, improved means for metering the distribution of fibers to the drum.

In accordance with the above objects and other objects which will be apparent from the following description and claims I have provided a new method and apparatus for electrostatically combining fiber and resin particles to form a mat in which the fiber and resin particles are fed intermittently to a rotating drum which carries them to a continuous belt upon which they are deposited in that form. The following description discloses one preferred embodiment of the invention in which the drawings are as follows:

FIG. 1 is a perspective view of an electrostatic matting machine made in accordance with the invention with the electrical connections represented diagrammatically;

FIG. 2 is a diagrammatic view illustrating the method and apparatus of FIG. 1 for conveying the fiber and resin particles from their containers to the depositing areas;

FIGS. 3–6 are partial diagrammatic elevations of the apparatus of FIG. 1 illustrating the method and apparatus for alternately depositing fibers and binder material.

In describing the preferred embodiment of the invention specific terminology will be resorted to for the sake of clarity. However, it is not my intention to be limited to the specific terms so selected and it is to be understood that each specific term includes all technical equivalents which operate in a similar manner to accomplish a similar purpose.

In the preferred embodiment of the invention shown in the drawings a conveyer belt 10, which may be an endless conveyer, is used to collect mixed fibers and resin in a predetermined shape to form the article 11 and then to remove the article 11 thus formed from the depositing area. Beneath conveyer belt 10 is disposed pattern electrode 12 on which pattern 13 is mounted. Rolling electrical contact 14 is positioned to maintain electrical contact with pattern 13. Contact 14 is connected through switch 15 to ground or, alternatively, a source of positive potential.

Rotating drum 17 is positioned transversely across and above belt 10 and is substantially parallel to and opposite electrode 12. Drum 17 is grounded. A corona discharge electrode 18 runs parallel to the axis of rotating drum 17 above belt 10 and is connected through switch 19 to either a positive potential source or a negative potential source. On the other side of rotating drum 17 are suction manifolds 22 and 23, the openings of which extend along the length of drum 17.

Fiber conveying belt 25 extends along the length of drum 17 and its upper surface is substantially parallel to the uppermost level of drum 17. Within belt 25 are electrodes 26, 27, and 28. Electrode 26 is connected through switch 29 either to ground or a negative potential source. Electrode 28 is connected to a positive potential source. Electrode 27 separates electrodes 26 and 28. Fiber trough 30 is disposed beneath belt 25 to catch excess fibers which fall from the under-surface of belt 25.

Above one end of belt 25, and disposed transversely across it is rotating fiber drum 32. Above drum 32 is fiber hopper 33 from which fiber particles 34 are fed to drum 32. Corona electrode 35 extends across the discharge opening of hopper 32 above drum 32 and is connected to a negative potential source. Fiber particles are fed to hopper 33 from the primary fiber particle source, metering cutter 36, and a secondary source, fiber cyclone separator 40. Fiber yarn 37 is fed to metering cutter 36 from spool 38 and enters hopper 33 from the gravity trough 39. Cyclone separator 40 receives fibers from fiber duct 41 which is connected to fiber suction manifold 23.

Resin conveying belt 45 is disposed along rotating drum 17 in substantially the same manner as, and parallel to, fiber conveying belt 25. Electrodes 46, 47, and 48 corresponding substantially to electrodes 26, 27, and 28 and are positioned beneath the upper surface of belt 45. Electrode 46 is connected by switch 49 either to ground or a positive potential source. Electrode 48 is connected to a negative potential source and electrode 47 separates electrodes 46 and 48. Resin trough 50 is disposed beneath the under surface of belt 45 to collect excess resin particles.

Rotating resin drum 52 is positioned above one end of belt 45 in substantially the same manner and in line with rotating fiber drum 32. Resin hopper 53 is positioned above drum 52 and feeds resin particles 54 to the drum. The resin particles 54 receive a positive electrostatic charge from corona electrode 55 which is connected to a positive potential source. Resin hopper 53 is supplied with resin in any manner, manually or otherwise (not illustrated) and in addition receives resin particles from a secondary source, resin cyclone separator 60. Cyclone separator 60 receives resin particles through duct 61 which is connected to resin suction manifold 22.

Above the ends of belts 25 and 45, opposite rotating drums 32 and 52, is positioned movable double flat electrode 63 which is rigidly fixed to trolley 66, movably mounted on rails 67. Double electrode 63 includes two electrode plates, 64 and 65. Trolley 66 and electrodes 65 are moved across the upper surface of rotating drum 17 and belts 45 and 25 by means of pneumatic cylinder 68 which is connected to trolley 66 through connecting rod 69. Above the left electrode plate 64, normally disposed above belt 25, is a rigidly fixed sliding contact 75 which is grounded. Above the right electrode plate 65, which is normally disposed over drum 17 between belt 25 and belt 45, is fixed sliding contact 76. Contact 76 is connected through switch 19 either to a positive potential source or a negative potential source. Above belt 45 is a grounded fixed sliding contact 77 which is adopted to contact plate 65.

In the normal operation of the apparatus illustrated in FIG. 1, a mat 11, made up of mixed fiber particles 34 and resin particles 54, is produced on moving belt 10. The shape of the article 11 is substantially determined by the pattern 13 on the pattern electrode 12. However, the shape, length, thickness, and physical characteristics of article 11 may be varied within wide limits by selectively varying the rate of rotation of pattern electrode 12, the speed of belt 10 and the speed of rotation of rotating drum 17. In addition the article 11 may be varied by selectively changing the quantity of the electrostatic charges employed. As will hereinafter further be shown variation in the article 11 may be attained by selectively varying the performance of the apparatus which feeds fiber particles 34 and resin particles 24 to the rotating drum 17.

The primary source of fiber particles to the apparatus of FIG. 1 is the metering cutter 36 into which is fed yarn 37 from spool 38. Cutter 36 chops the yarn at a selected rate and feeds it to fiber hopper 33, through gravity trough 39. This method and apparatus for the primary supply of fiber particles is preferred but is not the sole means by which fiber particles may be fed to hopper 33. Precut fibers may be used and multiple spools of yarn 37 may be fed to the cutter 36. In practice it is normally more convenient to supply the yarn from a spool or spools and then cut it to conform to the requirements of the article 11 to be produced. However the spun, newly cut fiber particles tend to remain as bundles which must be or at least preferably should be separated. The method and apparatus of the present invention is particularly efficient in separating such fiber bundles and is believed to be substantially superior to known methods for separating these bundles. For this reason the fiber particles are shown as being supplied from a spool of yarn 38. The fibers 34 may be of any vegetable, animal, mineral or synthetic fibrous material and preferably a material which is capable of retaining an electrostatic charge. A preferred material is Fiberglas which is a fibrous glass material capable of sustaining electrostatic charges.

The fiber particles 34 are metered from the opening in the bottom of hopper 33 to fall on the surface of fiber drum 32. Any known method of opening or closing the mouth at the bottom of hopper 33 may be used. Corona electrode 35 is positioned in front of and above fiber drum 32 thereby subjecting fiber particles 34 to a negative electrostatic charge. The particles 34 thus charged fall on the upper surface of rotating drum 32 which is grounded. Any substantial electrical charge buildup occasioned by the corona charge from electrode 35 is discharged through the ground drum 32. The charged particles 34 are carried on the surface of drum 32 into proximity of the upper surface belt 25. By virtue of the positively charged electrodes 28 opposite drum 32 and beneath the upper surface of belt 25 the charged particles 34 are attracted to the belt 25 from the grounded drum 32. The belt 25 may be made of any material having low conductivity and small electrification properties. Paper, neoprene and coated linen are examples of materials that are satisfactory for this purpose.

The charged fiber particles 34 are carried on the upper surface of belt 25 over separating electrode 27 and electrode 26. So long as electrode 26 is grounded the charged fiber particles 34 will tend to remain on the surface of belt 25. However, when electrode 26 is changed by switch 29 to a negative potential, which is the same polarity as the charged fiber particles 34, the particles 34 will be repelled from surface 25 along electrode 26 to the under surface of the grounded movable left electrode plate 64. As will hereinafter more fully be shown the charged particles 34 are then transferred in a controlled operation to rotating drum 17.

Resin particles 54 are metered from an opening in the bottom of hopper 53 in substantially the same manner in which the particles 34 are metered from hopper 33. The resin particles 54 may be any granular, powdered, or flaked binding material in a form substantially non-adhesive and non-cohesive which is adapted to be converted to an adhesive and cohesive form upon application of heat, pressure, moisture or otherwise. As the resin particles 54 leave hopper 53 they are subjected to a positive electrostatic charge from corona electrode 55. The particles 54 thus positively charged are attracted to the upper surface of resin drum 52, which is grounded to remove any excessive charge buildup from electrode 55. The charged particles 54 are then carried on rotating drum 52 to a point adjacent the upper surface of belt 45. By virtue of the negatively charged electrode 48 the positively charged particles are removed from the surface of grounded drum 52 to the upper surface of belt 45. Belt 45 may be of any material as described in the case of belt 25. The charged particles 54 are carried on belt 45 over separating electrode 47 to a position above electrode 46. So long as electrode 46 remains grounded the particles will remain on belt 45. When belt 46 is charged to a positive potential the positively charged particles 54 are repelled from the surface of belt 45 to the under side of right electrode plate 65 which is grounded through sliding contact 77.

One preferred embodiment for the transfer of fiber particles 34 and resin particles 54 from belts 25 and 45 respectively to movable flat electrode 65 and thence to rotating drum 17, and the formation of article 11 on belt 10, is illustrated in FIGS. 3-6. It is the object of this sequence of operations to deposit fiber and resin particles with maximum intermingling to form a coherent mat 11. Since this is accomplished primarily by the application of electrostatic forces, it is fundamentally important to prevent the excessive buildup of electrostatic charges at any point. This is accomplished by the method and apparatus illustrated.

In FIG. 3, trolley 66 has carried flat electrode 64 to the left of rotating drum 17. As shown in the drawing the left electrode plate 64 is electrically separated from the right electrode plate 65. The right electrode plate 65 is connected to sliding contact 76. The left electrode plate 64 is grounded by means of fixed sliding contact 75. At the same time electrode 26 is placed at negative potential by means of switch 29, causing negatively charged fiber particles 34 to jump from belt 25 to the under surface of the left electrode plate 64 which is grounded.

As shown in FIG. 4 trolley 66 is then drawn to the right by pneumatic cylinder 68 so that the left electrode plate 64 is directly over rotating drum 17 and the right electrode plate 65 is directly over resin belt 45. When this position is reached the right plate 65 is grounded through fixed sliding contact 77 and the left plate 64 is switched to negative potential through sliding contact 76 and switch 19. At the same time electrode 46 is charged to positive potential through switch 49. By virtue of the sudden change in the potential of the left electrode plate 64 from grounded to negative the particles 34 are impelled to grounded rotating drum 17. As they are carried around on the surface of drum 17 they are given an additional negative charge from corona electrode 18 through switch 19. As the recharged fibers 34 are carried around drum 17 they approach belt 10 opposite pattern electrode 12. Pattern 13 on the pattern electrode 12 is positively charged by rolling contact 14 through switch 15. This induces a positive charge on the upper surface of belt 10 which attracts fibers 34 to belt 10. The fibers 34 are placed on the belt 10 in the shape of pattern 13. While this is taking place the resin particles 54 on belt 45 are impelled from belt 45 to the right electrode plate 65 by virtue of the sudden change in potential of electrode 47 from grounded to positive potential.

In the next step, shown in FIG. 5, trolley 66 is moved to the left by pneumatic cylinder 68 placing left electrode plate 64 above fiber belt 25 and right electrode plate 65 over rotating drum 17. Sliding contact 76 is switched to positive polarity through switch 19 thereby impelling the positively charged resin particles 54 to the surface of drum 17. The resin particles 54 are carried around on the surface of drum 17 and recharged positively by corona electrode 18 which is switched to positive polarity by switch 19. As they approach belt 10 the positively charged resin particles 54 are attracted by the previously deposited negatively charged fiber particles 34. While resin particles 54 are being deposited by attraction to the oppositely charged fiber particles 34, pattern 13 is grounded. As shown in FIG. 5 any fiber remaining on the surface of drum 17 as it continues its rotation past the point of closest approach to belt 10 are removed by suction through fiber suction manifold 23.

Following the release of resin particles from right electrode plate 65 trolley 66 moves to the right as shown in FIG. 6, placing left electrode plate 64 carrying negatively charged fiber particles 34 above drum 17. Left plate electrode 64 is changed to negative polarity through contact 76 and switch 19 and the fibers are carried to drum 17 as described with reference to FIG. 4. Excess resin particles remaining on the surface of drum 17 are removed by resin suction manifold 22.

The resin manifold 22 and fiber manifold 23 are provided with an opening and closing apparatus (not illustrated) so that manifold 22 is open only when resin particles are on the adjacent surface of drum 17 and manifold 23 is open only when fiber particles are on the surface of drum 18 adjacent the manifold 22. Within the manifolds 22 and 23, alternating current discharging apparatus, as described in my copending application, Serial No. 671,632, is located. This removes any remaining charges on the particles 34 and 54. The fiber particles 34 are returned to fiber hopper 40 through duct 41 and the resin particles 54 are returned to resin hopper 60 through duct 61.

Throughout the steps illustrated in FIGS. 3-6 the rotating drum 17 is grounded. This serves to remove excess electrostatic charges which may be accumulated on its surface by the resin particles 54 or fiber particles 34.

Many variations in the electrostatic arrangement shown in FIGS. 3-6 may be made provided the relative polarities of the various elements are not changed. Thus all positive charges may be changed to negative and vice versa, so long as the changes are made consistently throughout the apparatus. In some cases, where grounded electrodes are shown it may be preferred to use a potential of a fixed polarity and this may be done so long as the polarity selected is not relatively inconsistent with respect to the polarity of the other elements. It may be stated generally that the left hand, or fiber, side should be of opposite polarity to the right hand, or resin, side and that the center electrode over drum 17 in contact with sliding contact 76 and the corona electrode 18 should have the same polarity as the particles being carried on drum 17.

The amount of the circumferential surface of drum 17 covered at any one time by resin particles 54 or fiber particles 34 may be varied. Thus, one revolution of the drum 17 might be used for fiber particles 34 and the next revolution for resin particles 54 or alternating quarters of the drum may be used for the alternating particles. It has been found satisfactory to operate on a half-drum basis whereby one half of the drum is covered with fiber and the other half with resin particles. Whatever variations are used, the ultimate deposition on belt 10 is more satisfactory when the alternating quantities of particles are substantially equal. This may be attributed to the fact that, as illustrated in FIG. 5, the resin particles are attracted by the negative charges on fiber particles 34 and the fiber particles 34 are accordingly discharged. If the amounts of particles are radically different there will tend to be either an excess of negative charges, when the fibers 34 are preponderant, or an incomplete attraction of resin particles 54, when the resin particles are preponderant.

With the method and apparatus illustrated in FIGS. 3-6 a reinforced resin-fiber structure 11 is built up in which the fiber particles 34 and resin particles 54 are each substantially uniformly dispersed and in which the fiber and resin particles are substantially completely intermingled. This is caused by the fact that the fiber particles 34 are all charged substantially equally and thus tend to repel each other and the resin particles 54 are all charged substantially equally and tend to repel each other, while the resin particles 54 are charged opposite to the fiber particles 34 and thus tend to attract each other. By virtue of the electrostatic charges on the particles, substantially the same amount of resin particles will tend to be attracted to each fiber particle. This provides a uniform structure 11. The principal deterrent to attaining articles of great thickness by electrostatic deposition is the buildup of excessive electrostatic charges on the surface of the article. By virtue of the method and apparatus of this invention these charges are kept at a minimum or are utilized to deposit oppositely charged particles.

With specific reference to belt 25 shown in FIGS. 1 and 2, it has been found that the transfer of fiber particles from the belt 25 to the electrode 64 must be accomplished instantaneously. If the field between electrodes 26 and 64 is maintained for any length of time, fibers tend to accumulate along the edge of electrode 64 which is approached by belt 25. In general, it may be said that the faster the speed of the belt, the shorter the duration of the field between electrodes 26 and 64 must be; and the shorter the duration the field is maintained at, the higher the field must be in order to pick up all available fibers from belt 25. The strength of the field is, in turn, limited by the breakdown voltage which will cause arcing.

As an alternative to the specific structure and method shown in FIGS. 1 and 2 an arrangement may be used which will permit longer charging times and thus a relatively lower field between electrodes 26 and 64. In this alternative arrangement belt 25 is metalized by giving it a metal coating, or it is, in fact, a metal belt. Belt 25 is in that case permanently grounded. With this alternative it has been found that the drum 32 may be completely eliminated and the fibers may be dropped directly on belt 25 and charged while travelling on this belt. In this case electrode 64 is intermittently placed on a high potential opposite in polarity to the charge of the fibers. Another advantageous feature is produced by this arrangement. It has been found that the charging current through corona electrode 35 increases with the amount of fibers deposited. Thus, by means of a current-sensitive relay the delivery of fibers from cutter 36 may be automatically controlled. A similar arrangement may be applied to the resin supplying system.

While, in accordance with the provisions of the statutes, I have illustrated and described the best form of embodiment of my invention now known to me, it will be apparent to tshe skilled in the art that changes may be made in the form of the apparatus described without departing from the spirit and scope of the invention, as set forth in the appended claims, and that in some cases certain features of my invention may be used to advantage without a corresponding use of other features.

Having thus described my invention, I claim:

1. A method of forming fibrous articles comprising charging and alternately electrostatically collecting fiber particles and binder particles in a collecting area, continuously transferring said alternately collected fiber and binder particles to a depositing area, subjecting said fiber particles to an electrostatic corona charge opposite in polarity to the charge on said binder particles and subjecting said binder particles to an electrostatic corona charge opposite in polarity to the charge on said fiber particles as they are transferred from said collecting area to said depositing area, continuously alternately depositing said particles in said depositing area to form said fibrous articles and continuously removing the fibrous articles thus formed from said depositing area.

2. A method of forming a fibrous article comprising continuously alternately collecting fiber particles and binder particles in a collecting area, said fiber particles and binder particles bearing electrostatic charges of opposite polarity, continuously transferring said particles from said collecting area to a depositing area, subjecting said fiber particles and binder particles to an electrostatic corona charge of opposite polarity respectively as they are transferred from said collecting area to said depositing area, depositing said particles in the form of said fibrous article in the depositing area and continuously removing the fibrous article thus formed from the depositing area.

3. A method of forming a fibrous article comprising alternately collecting fiber particles and binder particles in a collecting area, said fiber particles bearing an electrostatic charge of negative polarity and said binder particles bearing an electrostatic charge of positive polarity, continuously transferring said alternately deposited particles from said collecting area to a depositing area, subjecting said fiber particles to a negative corona charge during said transfer and subjecting said binder particles to a positive corona charge during said transfer, depositing said particles in said depositing area to form said fibrous article and continuously removing the fibrous article thus formed from the depositing area.

4. Apparatus for forming fibrous articles comprising means for electrostatically alternately collecting fiber particles and binder particles in a collecting area, transfer means for transferring said particles to a depositing area, a depositing area comprising a continuously moving belt, corona means for applying electrostatic charges to said particles as they are carried on said transfer means, a pattern electrode disposed on the side of said depositing area opposite said transfer means, said pattern electrode being shaped to conform to the shape of the fibrous articles to be produced.

5. Apparatus for forming fibrous articles comprising an electrically grounded rotating drum, electrode means for alternately collecting fiber particles and resin particles on the surface of said drum, a moving belt disposed adjacent said drum at a point remote from said electrode means, a corona charging electrode disposed adjacent the surface of said drum between said electrode means and said belt and a pattern electrode disposed on the side of said belt substantially opposite said drum to cause said fiber and binder particles to be deposited on said belt from said drum in the shape of the fibrous articles to be produced.

6. Apparatus for forming fibrous articles from fiber particles and resin particles comprising fiber particle dispensing means and resin particle dispensing means, reciprocable fiber and resin particle collecting means, conveyor means for transferring said fiber particles and resin particles from said dispensers to said collecting means, corona electrode means for electrostatically charging said fiber particles and resin particles between said dispenser means and said conveyor means, conveyor electrode means disposed beneath said conveyor means for attracting said charged particles to the surface of said conveyor means, a collecting drum disposed beneath said reciprocable collecting means, electrical means for alternately moving said fiber particles and resin particles from the said collecting means to said collecting drum, a depositing belt disposed adjacent said collecting drum remote from said collecting means, a corona electrode disposed adjacent the surface of said collecting drum between said belt and said collecting means and a pattern electrode means disposed on side of said belt opposite said collecting drum.

7. Apparatus for forming fibrous articles from fiber particles and resin particles comprising a fiber dispensing hopper, a rotating drum disposed beneath said hopper adapted to receive fiber particles on its surface, a negative corona electrode disposed in front of dispensing opening of said hopper for applying a negative electrostatic charge to said fiber particles, a conveyor belt disposed beneath said rotating drum, a positive electrode disposed beneath said belt and said drum for attracting the fiber particles from the drum to the belt, a resin dispensing hopper, a rotating drum disposed beneath said hopper, a positive corona electrode disposed in front of dispensing opening of said hopper for applying a positive electrostatic charge to said resin particles, a resin conveyor belt disposed beneath said drum and moving in the same direction as the fiber conveying belt, a negative electrode disposed beneath said belt and said drum for attracting the resin particles from the drum to the belt, a reciprocable trolley disposed above said conveyor belts and adapted to move transversely across and above said belts, an electrode plate suspended from said trolley, a fiber electrode depending from said plate on the side nearest said fiber conveyor belt, a resin electrode depending from the side of said plate nearest said resin conveying belt, a second electrode beneath said fiber conveying belt for impelling said fiber particles toward said fiber electrode, means for changing the polarity of said second fiber electrode, a second electrode under said resin conveyor belt for impelling said resin particles toward said resin electrode, means of changing the polarity of said second resin electrode, a grounded rotating drum disposed beneath said electrode plate, electrode means for impelling said fiber and resin particles from said electrode plate to the surface of said rotating drum, a moving conveyor belt disposed adjacent said rotating drum substantially opposite said electrode plate, a corona electrode disposed adjacent the surface of said rotating drum between said belt and said electrode plate, whereby said fiber and resin particles are alternately collected on said rotating drum and continuously deposited on said conveyor belt to form said fibrous articles.

References Cited in the file of this patent

UNITED STATES PATENTS

| | | |
|---|---|---|
| 2,152,077 | Meston et al. | Mar. 28, 1939 |
| 2,686,141 | Sawyer | Aug. 10, 1954 |
| 2,698,271 | Clark | Dec. 28, 1954 |
| 2,790,741 | Sonneborn et al. | Apr. 30, 1957 |
| 2,820,716 | Harmon et al. | Jan. 21, 1958 |